United States Patent
Kim

(10) Patent No.: US 7,042,815 B2
(45) Date of Patent: May 9, 2006

(54) APPARATUS AND METHOD FOR REDUCING PROGRAM SELECTION TIME IN MULTI-CHANGER OF OPTICAL DISK

(75) Inventor: Jong-bum Kim, Gyeonggi-do (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 354 days.

(21) Appl. No.: 10/376,478

(22) Filed: Mar. 3, 2003

(65) Prior Publication Data
US 2004/0013054 A1   Jan. 22, 2004

(30) Foreign Application Priority Data
Jul. 19, 2002   (KR) ............................... 2002-42479

(51) Int. Cl.
*G11B 21/08* (2006.01)
(52) U.S. Cl. ............... 369/30.79; 369/30.33; 720/614; 720/615
(58) Field of Classification Search ............ 369/30.33, 369/37.01, 53.3, 30.5, 30.62, 30.71, 30.91, 369/53.43, 53.45, 30.27; 720/614, 615
See application file for complete search history.

(56) References Cited

U.S. PATENT DOCUMENTS

| | | | | |
|---|---|---|---|---|
| 5,903,527 A | * | 5/1999 | Park ........................ 369/37.01 |
| 6,320,827 B1 | * | 11/2001 | Otsuka ..................... 369/30.33 |
| 6,603,721 B1 | * | 8/2003 | Kim et al. ................. 369/53.3 |
| 6,621,769 B1 | * | 9/2003 | Ochi ........................ 369/30.33 |
| 6,791,909 B1 | * | 9/2004 | Takenaka ................. 369/30.09 |
| 6,791,911 B1 | * | 9/2004 | Zhou et al. .............. 369/30.33 |

FOREIGN PATENT DOCUMENTS

KR     1998-61650     7/1998

* cited by examiner

*Primary Examiner*—Tan Dinh
(74) *Attorney, Agent, or Firm*—Staas & Halsey LLP

(57) ABSTRACT

An apparatus and a method of reducing a program selection time in an optical disc multi-changer by determining whether a disc is mounted on a disc mounting unit before it is determined whether the disc is chucked and a type of the disc is discriminated. The method of operating the optical disc multi-changer having a tray with disc mounting units, includes receiving a signal to determine whether a disc is mounted on a current disc mounting unit of the disc mounting units, outputting a command signal to move to a next disc mounting unit of the disc mounting units where the received signal indicates that no disc is mounted on the current disc mounting unit, and receiving a program selection signal where the received signal is received from all disc mounting units. Accordingly, it is possible to reduce a program selection time by determining whether the disc is mounted on the disc mounting unit before the disc chucking and discrimination of the type of the disc are performed.

16 Claims, 4 Drawing Sheets

APPARATUS AND METHOD FOR REDUCING PROGRAM SELECTION TIME IN MULTI-CHANGER OF OPTICAL DISK

CROSS-REFERENCE TO RELATED APPLICATIONS

This application claims the benefit of Korean Patent Application No. 2002-42479, filed on Jul. 19, 2002, in the Korean Intellectual Property Office, the disclosure of which is incorporated herein in its entirety by reference.

BACKGROUND OF THE INVENTION

1. Field of the Invention

The present invention relates to an apparatus and a method of operating an optical disc multi-changer, and more particularly, to an apparatus and a method of reducing a program selection time in an optical disc multi-changer by determining whether a disc is mounted on a disc mounting unit, before it is determined whether the disc is chucked and a type of the disc is discriminated.

2. Description of the Related Art

A multi-changer of a disc allows a user to select an order of playing programs in a disc mounted in a disc mounting unit. However, while the user selects the order of playing the programs, the multi-changer attempts to perform a disc chucking operation and a disc type discriminating operation even where no disc is mounted on the disc mounting unit. Thus, where a user desires to select an order of playing programs in discs mounted on disc mounting units, and one or more of the disc mounting units are not mounted with the respective discs, the user has to wait for a long period of time to select the order of playing the programs.

FIG. 1 shows a flowchart illustrating a method of reducing a program selection time in a conventional optical disc multi-changer. In operation 100, it is determined whether a disc is chucked so as to discriminate the type of the disc which is currently mounted on a disc mounting unit. Here, to chuck the disc refers to a spindle motor (not shown) being safely fixed to rotate the disc.

Where the disc is chucked, the type of the disc, which is currently mounted on the disc mounting unit, is discriminated in operation 101.

In operation 102, it is determined whether a disc mounting unit is opened. Where the disc mounting unit is closed, it is determined whether the discrimination of the disc type is completed, in operation 103.

Where the type of the disc is discriminated, it is determined whether the disc mounting unit is empty in operation 104. Where the disc mounting unit is empty, a flag indicating that the disc mounting unit is empty is set in operation 105. Where the flag indicating that the disc mounting unit is empty is set, the next disc mounting unit number is checked in operation 106.

In operation 107, after the next disc mounting unit number is checked, a servo operation is stopped. Where the servo operation is stopped, it is determined whether a program mode is a process to check the disc mounting unit in operation 108. Here, the process to check the disc mounting unit refers to checking the type of the disc and a number of tracks or chapters, so as to enable a user to select a program to be played. Where the disc mounting unit is being checked while the servo is stopped, the next disc mounting unit number is checked in operation 109.

In operation 110, it is determined whether all disc mounting units are checked. Where all disc mounting units are not checked, the method returns to the operation 110. Where all disc mounting units are checked, the user selects a playing order of programs in operation 111.

States of all disc mounting units in the multi-changer are checked before the user selects the program to be played. As described above, since the disc mounting units, even if they are empty, are required to be chucked and their types discriminated, the user has to wait until all disc mounting units are checked.

SUMMARY OF THE INVENTION

Accordingly, it is an aspect of the present invention to provide a method of reducing a program selection time in an optical disc multi-changer by determining whether a disc is mounted on a disc mounting unit before the disc is chucked and the type of the disc is discriminated.

It is another aspect of the present invention to provide an apparatus which reduces a program selection time in an optical disc multi-changer by determining whether a disc is mounted on a disc mounting unit before the disc is chucked and the type of the disc is discriminated.

Additional aspects and advantages of the invention will be set forth in part in the description which follows and, in part, will be obvious from the description, or may be learned by practice of the invention.

To achieve the above and/or other aspects of the present invention, there is provided a method of operating an optical disc multi-changer having a tray which includes disc mounting units to mount discs, the method comprising receiving a signal to determine whether a disc is mounted on a current disc mounting unit of the disc mounting units, outputting a command signal to move to a next disc mounting unit in response to the received signal indicating no disc is mounted on the current disc mounting unit, and receiving a program selection signal in response to the received signal being received for each of the disc mounting units.

The method may further comprise chucking the disc mounted on the current disc mounting unit and discriminating a type of the chucked disc, in response to the signal indicating the disc is mounted on the current disc mounting unit.

To achieve the above and/or other aspects of the present invention, there is provided an optical disc multi-changer comprising a tray having disc mounting units to mount discs, a first control device which determines and outputs a signal that indicates whether a disc is mounted on a current disc mounting unit of the disc mounting units, and controls a movement to a next disc mounting unit of the disc mounting units, and a second control device which outputs a movement control signal to move to the next disc mounting unit, to the first control device, in response to no disc being mounted on the current disc mounting unit, and receives a program order selection signal in response to the signal being received for each of the disc mounting units.

The second control device may chuck the disc mounted on the current disc mounting unit and discriminate a type of the chucked disc, in response to the disc being mounted on the current disc mounting unit.

BRIEF DESCRIPTION OF THE DRAWINGS

These and/or other aspects and advantages of the present invention will become apparent and more readily appreciated from the following description of the embodiments, taken in conjunction with the accompanying drawings of which.

DETAILED DESCRIPTION OF THE PREFERRED EMBODIMENTS

Figure 1:
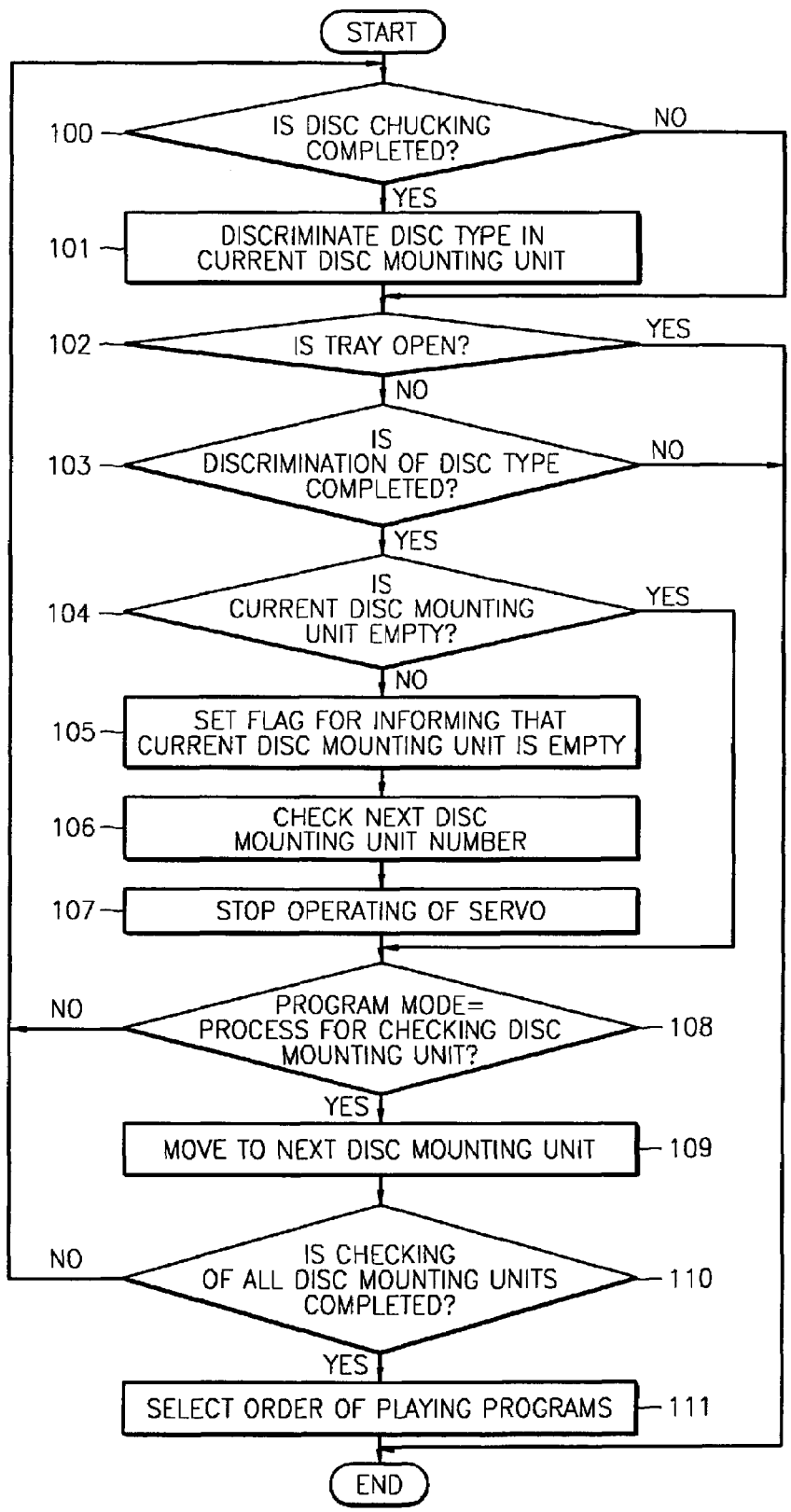
FIG. 1 is a flowchart illustrating a conventional method of reducing a program selection time in a conventional optical disc multi-changer.

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 2:
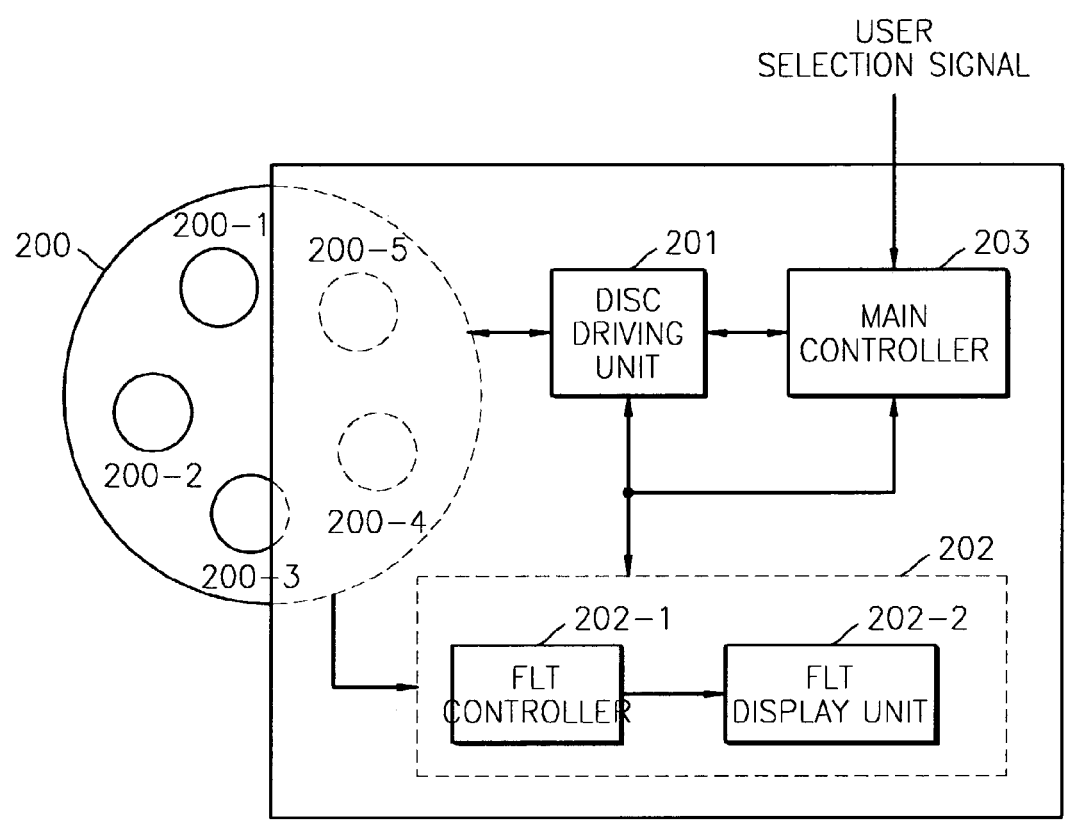
FIG. 2 is a block diagram illustrating an apparatus which reduces a program selection time in an optical disc multi-changer according to an embodiment of the present invention.

FIG. 2 shows an apparatus which reduces a program selection time in an optical disc multi-changer according to an embodiment of the present invention. The apparatus includes a tray 200 having, for example, first through fifth disc mounting units, 200-1 through 200-5, a disc driving unit 201, a fluorescent light tube (FLT) 202 having a fluorescent light tube (FLT) controller 202-1 and a fluorescent light tube (FLT) display unit 202-2, and a main controller 203.

Figure 3A:
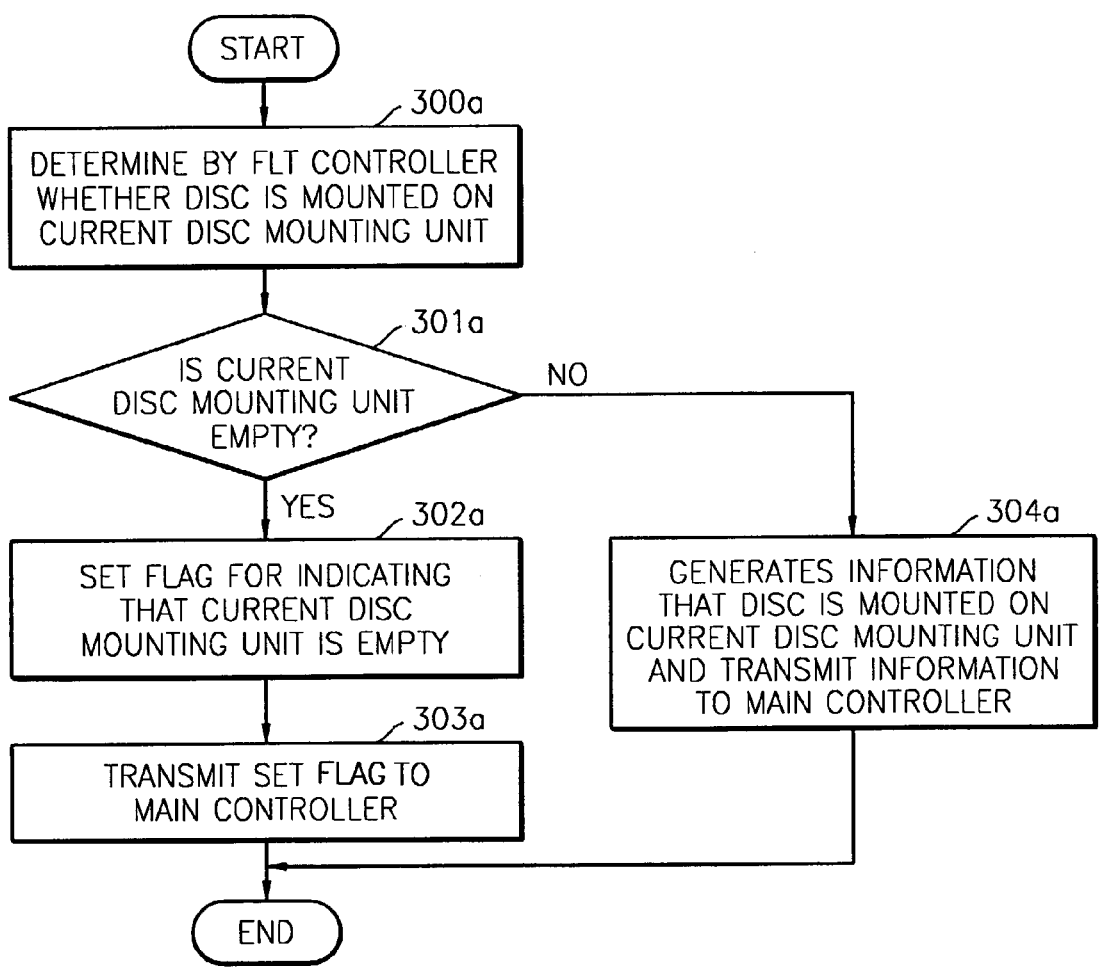
FIGS. 3A and 3B are flowcharts illustrating a method of reducing a program selection time in an optical disc multi-changer according to the present invention.
Figure 3B:
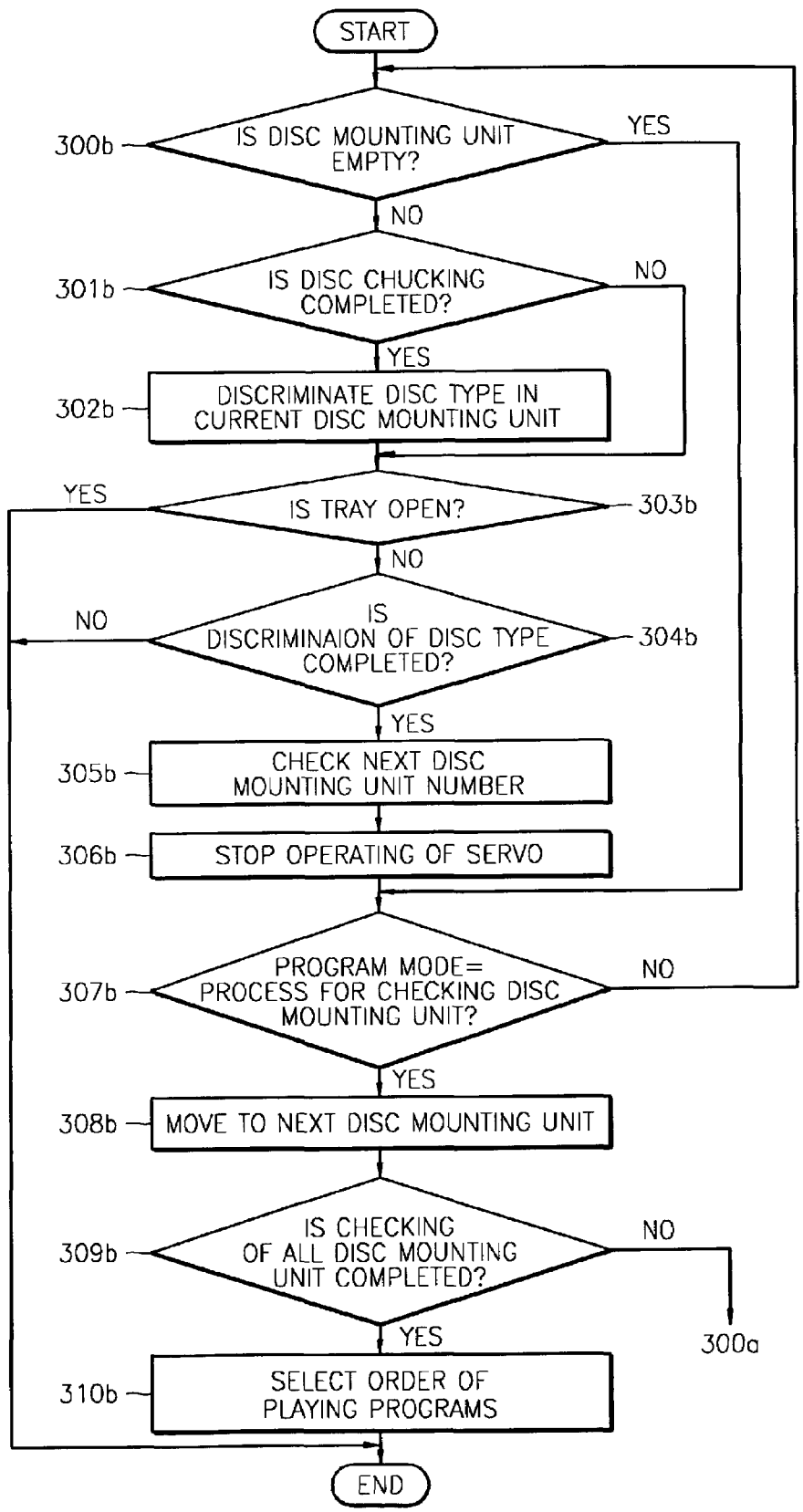

FIGS. 3A and 3B show flowcharts illustrating a method of reducing a program selection time in the optical disc multi-changer according to the present invention. Specifically, FIG. 3A is a flowchart illustrating a method of operating the fluorescent light tube (FLT) controller 202-1, and FIG. 3B is a flowchart illustrating a method of discriminating the type of the disc, by the main controller 203, and reducing the program selection time.

The method of FIG. 3A includes determining whether a disc is mounted on a current disc mounting unit (operation 300a), determining whether the current disc mounting unit is empty (operation 301a), setting a flag to indicate that the current disc mounting unit is empty (operation 302a), transmitting the set flag to the main controller 203 (operation 303a), and generating information that the disc is mounted on the current disc mounting unit and transmitting the information to the main controller 203 (operation 304a).

The method of FIG. 3B includes determining whether a disc mounting unit is empty (operation 300b), determining whether a disc chucking is completed (operation 301b), discriminating a type of a disc which is mounted on the current disc mounting unit (operation 302b), determining whether a tray is open (operation 303b), determining whether the discrimination of the type of the disc is completed (operation 304b), checking a next disc mounting unit number (operation 305b), stopping servo operations (operation 306b), determining whether a program mode is a process of checking the disc mounting unit (operation 307b), moving to the next disc mounting unit (operation 308b), determining whether all disc mounting units have been checked (operation 309b) and selecting an order of playing programs (operation 310b).

Hereinafter, the present invention will be described in more detail with reference to FIGS. 2 through 3B.

To reduce a program selection time in an optical disc multi-changer, the FLT controller 202-1 should determine whether a disc is mounted on a disc mounting unit, and the main controller 203 should receive a determination signal from the FLT controller 202-1, chuck the disc, discriminate the type of the disc, and select a program to be played. The disc driving unit 201 includes a spindle servo (not shown), a pick-up (not shown) and a sensor (not shown).

Referring to FIG. 3A, the FLT controller 202-1 determines whether a disc is mounted on one of the disc mounting units 200-1 through 200-5. That is, the FLT controller 202-1 determines whether the disc is currently mounted on the disc mounting unit 200-1 (or any of the other disc mount units 200-2 through 5) (operation 300a). For example, a sensor (not shown) is positioned under the disc mounting unit 200-1 to determine whether the disc is mounted on the disc mounting unit 200-1. The FLT controller 202-1 can determine whether the disc is mounted on the disc mounting unit 200-1 by receiving a sensing signal of the sensor. In addition, the FLT controller 202-1 outputs a control signal, which moves the disc mounting units 200-1 through 200-5, under a control of the main controller 203, to the disc driving unit 201 which moves the disc mounting unit 200-1 to a position of a next mounting unit 200-2 (this is only an example) according to the control signal of the FLT controller 202-1.

The FLT controller 202-1, which receives the sensing signal of the sensor, determines whether, for example, the current disc mounting unit 200-1 is currently empty (operation 301a). Where the disc mounting unit 200-1 is empty, a flag which indicates that the disc mounting unit 200-1 is currently empty is set (operation 302a). The FLT controller 202-1 transmits the set flag, which informs that the disc mounting unit 200-1 is currently empty, to the main controller 203 (operation 303a). Where the disc is mounted on the disc mounting unit 200-1, the FLT controller 202-1 generates information that the disc is mounted on the disc mounting unit 200-1 and transmits the information to the main controller 203 (operation 304a).

Referring to FIG. 3B, the main controller 203 receives a determination signal of the FLT controller 202-1, chucks the disc, discriminates the type of the disc, and selects the program to be played.

The main controller 203 determines whether, for example, the disc mounting unit 200-1 is currently empty (operation 300b). That is, the main controller 203 receives a flag which indicates that a disc mounting unit is empty or information which indicates that the disc is mounted on the disc mounting unit, to determine whether the disc mounting unit 200-1 is empty or the disc is mounted on the disc mounting unit 200-1.

Where the flag (or information) which indicates that the disc mounting unit 200-1 is empty, which is output from the FLT controller 202-1, is input to the main controller 203, the main controller 203 determines that the disc mounting unit 200-1 is currently empty. Where a current program mode is a process to check the disc mounting units 200-1 through 200-5, the main controller 203 outputs a control signal to move to a next disc mounting unit, for example, the mounting unit 200-2 (operations 307b and 308b).

In a conventional multi-changer, even where no disc is mounted on a disc mounting unit, the multi-changer examines and attempts to perform a disc chucking and a disc type discriminating operations. Thus, a user has to wait for a long period of time before a desired program can be played. However, in the present invention, where, for example, the disc mounting unit 200-1 is empty, it is skipped without performing a disc chucking and a discrimination of the type of the disc, and a next disc mounting unit, for example, the disc mounting unit 200-2 is examined. Therefore, in the present invention, a user doesn't have to wait for a long period of time.

Referring back to FIG. 3B, where information indicating that the disc is mounted on the disc mounting unit 200-1, which is output from the FLT controller 202-1, is input to the main controller 203, the main controller 203 determines that the disc is currently mounted on the disc mounting unit 200-1, and determines whether the disc is chucked (operation 301b). Here, to chuck the disc refers to a spindle motor being safely fixed to rotate the disc.

After the disc is chucked, the main controller 203 discriminates the type of the disc which is mounted on the disc mounting unit 200-1 (operation 302b). The multi-changer of the present invention includes disc mounting units on which a digital video disc containing chapters, a compact disc containing tracks, and other kinds of discs can be mounted, and thus the controller 203 is required to discriminate the type of the disc which is currently mounted in the disc mounting unit 200-1.

Where the type of the disc is discriminated, the main controller 203 determines whether the tray 200 is open (operation 303b). Where the tray 200 is closed, the main controller 203 determines whether the discrimination of the type of the disc is completed (operation 304b). Where the discrimination of the type of the disc is completed, the main controller 203 checks a next disc mounting unit number, for example, the disc mounting unit number 200-2 (operation 305b).

Where the next disc mounting unit 200-2 number is checked, the main controller 203 stops the operation of the servo (operation 306b). The next disc mounting unit 200-2 number is checked after the disc in the disc mounting unit 200-1 is chucked and its type discriminated. Where the operation of the servo is stopped, the main controller 203 determines whether the program mode is the process to check the disc mounting units, for example, 200-1 through 200-5 (operation 307b). Here, the process to check the disc mounting unit means checking the type of the disc and a number of tracks or chapters thereof, to enable the user to select the program to be played.

Where the disc mounting unit is checked while the operation of the servo is stopped, the main controller 203 transmits a control signal to move to the next disc mounting unit to the FLT controller 202-1, and the FLT controller 202-1 outputs the transmitted control signal from the main controller 203 to the disc driving unit 201. The disc driving unit 201 moves the current disc mounting unit 200-1 to a location of the next disc mounting unit 200-2 according to the control signal of the FLT controller 202-1. Where the disc is currently mounted on the disc mounting unit 200-1, the current disc mounting unit 200-1 is moved to the position of the next disc mounting unit 200-2 after the disc is chucked and the type of the disc is discriminated. Where the disc is not currently mounted on-the disc mounting unit 200-1, the current disc mounting unit 200-1 is moved to the position of the next disc mounting unit 200-2 without chucking and discriminating the type of the disc.

Where the disc mounting unit 200-1 is moved to the position of the next disc mounting unit 200-2, the main controller 203 determines whether all disc mounting units 200-1 through 200-5 have been checked. If not, the method returns to the operation 300a, and thus the main controller 203 determines whether discs are mounted on the disc mounting units 200-1 through 200-5 (operation 309b).

After all disc mounting units 200-1 through 200-5 are checked, the user may select an order of playing the programs (operation 310b). For example, the user can select to play a second chapter of a digital video disc, which is mounted on a first disc mounting unit 200-1, first and play a seventh track of a compact disc, which is mounted on a third disc mounting unit 200-3 second.

As described above, it is possible to reduce a program selection time by determining whether a disc is mounted on a disc mounting unit before a disc chucking and a discrimination of the type of the disc are performed.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A method of operating an optical disc multi-changer having a tray which includes disc mounting units to mount discs, the method comprising:
   receiving a signal to determine whether a disc is mounted on a current disc mounting unit of the disc mounting units;
   chucking the disc mounted on the current disc mounting unit and discriminating a type of the chucked disc, in response to the signal indicating the disc is mounted on the current disc mounting unit;
   outputting a command signal to move to a next disc mounting unit of the disc mounting units in response to the signal indicating no disc is mounted on the current disc mounting unit; and
   receiving a program selection signal in response to the signal being received for each of the disc mounting units.

2. An optical disc multi-changer comprising:
   a tray having disc mounting units to mount discs;
   a first control device which determines and outputs a signal that indicates whether a disc is mounted on a current disc mounting unit of the disc mounting units, and controls a movement to a next disc mounting unit of the disc mounting units; and
   a second control device which outputs a movement control signal to move to the next disc mounting unit, to the first control device, in response to no disc being mounted on the current disc mounting unit, and receives a program order selection signal in response to the signal being received for each of the disc mounting units,
   wherein the second control device chucks the disc mounted on the current disc mounting unit and discriminates a type of the chucked disc, in response to the disc being mounted on the current disc mounting unit.

3. The optical disc multi-changer of claim 2, wherein the second control device omits disc chucking and discriminating operations of the optical disc multi-changer for the current disc mounting unit in response to no disc being mounted on the current disc mounting unit.

4. The optical disc multi-changer of claim 3, wherein the second control device outputs the movement control signal to check whether the next disc mounting unit is empty in response to a mode to check a predetermined number of the disc mounting units.

5. The optical disc multi-changer of claim 2, wherein the optical disc multi-changer operates the discs that are of the same type, different types, or a combination thereof.

6. The optical disc multi-changer of claim 2, further comprising:
   a disc driving unit which drives the tray, and includes a spindle servo, a pick-up and a disc sensor; and
   a fluorescent light tube display unit, wherein the first control device is a fluorescent light tube controller.

7. The optical disc multi-changer of claim 2, wherein the program order selection signal is a signal that defines an order of playing one or more programs from one or more of the discs mounted on the tray.

8. The method of claim 1, wherein the outputting of the command signal includes skipping chucking and discriminating operations of the optical disc multi-changer for the current disc mounting unit in response to no disc being mounted on the current disc mounting unit.

9. The method of claim 8, wherein the outputting of the command signal further includes outputting the movement control signal to determine whether the next disc mounting unit is empty in response to a mode to check a predetermined number of the disc mounting units.

10. A method of operating an optical disc multi-changer having a tray which includes disc mounting units to mount discs, the method comprising:
 receiving a signal to determine whether a disc is mounted on a current disc mounting unit of the disc mounting units;
 chucking the disc mounted on the current disc mounting unit and discriminating a type of the chucked disc, in response to the signal indicating the disc is mounted on the current disc mounting unit;
 outputting a command signal to move to a next disc mounting unit of the disc mounting units in response to the signal indicating no disc is mounted on the current disc mounting unit;
 receiving a program selection signal in response to the signal being received for each of the disc mounting units;
 determining whether the tray is closed;
 determining whether the discriminating of the type of the chucked disc is completed in response to the tray being closed; and
 determining whether a current mode of the disc multi-changer is a mode to check a predetermined number of the disc mounting units.

11. A method of operating an optical disc multi-changer having a tray which includes disc mounting units to mount discs, the method comprising:
 determining a number of the disc mounting units having the respective discs mounted thereon; and
 performing chucking and discriminating disc type operations of the disc multi-changer for the number of the disc mounting units having the respective discs mounted thereon,
 wherein determining of the number of the disc mounting units further comprises:
 determining whether a first disc is mounted on a current disc mounting unit of the disc mounting units before performing the chucking and discriminating disc type operations for the current disc mounting unit, and
 performing the chucking and discriminating disc type operations for the current disc mounting unit, in response to the first disc being mounted on the current disc mounting unit, before determining whether a second disc is mounted on a next disc mounting unit of the disc mounting units.

12. A method of operating an optical disc multi-changer having a tray which includes disc mounting units to mount discs, the method comprising:
 determining a number of the disc mounting units having the respective discs mounted thereon; and
 performing chucking and discriminating disc type operations of the disc multi-changer for the number of the disc mounting units having the respective discs mounted thereon,
 wherein the determining of the number of the disc mounting units further comprises:
 determining whether a first disc is mounted on a current disc mounting unit of the disc mounting units before performing the chucking and discriminating disc type operations for the current disc mounting unit, and
 skipping the chucking and discriminating disc type operations for the current disc mounting unit and determining whether a second disc is mounted on a next disc mounting unit of the disc mounting units, in response to no disc being mounted on the current disc mounting-unit.

13. The method of claim 11, further comprising receiving a program selection signal so as to define an order of playing one or more programs from one or more of the discs mounted on the tray.

14. An optical disc multi-changer comprising:
 a tray having disc mounting units;
 a disc driving unit which drives the tray;
 a first control device which determines whether discs are mounted on the disc mounting units and controls the disc driving unit; and
 a second control device which performs chucking and discriminating operations of the disc multi-changer for a number of the disc mounting units having the respective discs mounted thereon, wherein the second control device omits the chucking and discriminating operations for a number of disc mounting units having no disc mounted thereon,
 wherein the second control device outputs a movement control signal to move to a next disc mounting unit of the disc mounting units, to the first control device, in response to no disc being mounted on a current disc mounting unit of the disc mounting units examined by the first control device, and
 wherein the optical disc multi-changer determines whether no disc is mounted on the current disc mounting unit before performing the chucking and discriminating operations for the current disc mounting unit so as to reduce a program selection time of the optical disc multi-changer.

15. The optical disc multi-changer of claim 14, wherein the second control device receives a program order selection signal that defines an order of playing one or more programs from one or more of the discs mounted on the tray.

16. The optical disc multi-changer of claim 14, wherein the optical disc multi-changer operates the discs mounted on the tray that are of the same type, different types, or a combination thereof.

* * * * *